(12) United States Patent
Takahashi et al.

(10) Patent No.: US 12,473,380 B2
(45) Date of Patent: Nov. 18, 2025

(54) POLYMERIZABLE UNSATURATED GROUP-CONTAINING CYCLODEXTRIN DERIVATIVE

(71) Applicant: KYOEISHA CHEMICAL CO., LTD., Osaka (JP)

(72) Inventors: Yuya Takahashi, Nara (JP); Bunsho Kure, Nara (JP); Tsuyoshi Yamaguchi, Nara (JP); Naomi Takenaka, Nara (JP); Yoshinori Takashima, Osaka (JP); Akira Harada, Osaka (JP); Motofumi Osaki, Osaka (JP)

(73) Assignee: KYOEISHA CHEMICAL CO., LTD., Osaka (JP)

( * ) Notice: Subject to any disclaimer, the term of this patent is extended or adjusted under 35 U.S.C. 154(b) by 459 days.

(21) Appl. No.: 18/006,926

(22) PCT Filed: Jul. 21, 2021

(86) PCT No.: PCT/JP2021/027276
§ 371 (c)(1),
(2) Date: Jan. 26, 2023

(87) PCT Pub. No.: WO2022/024908
PCT Pub. Date: Feb. 3, 2022

(65) Prior Publication Data
US 2024/0043573 A1 Feb. 8, 2024

(30) Foreign Application Priority Data
Jul. 29, 2020 (JP) ................................. 2020-128269

(51) Int. Cl.
*C08B 37/16* (2006.01)

(52) U.S. Cl.
CPC ................................. *C08B 37/0012* (2013.01)

(58) Field of Classification Search
CPC ................................. C08B 37/0012; C08L 5/16
See application file for complete search history.

(56) References Cited

U.S. PATENT DOCUMENTS

| 8,569,451 B2 | 10/2013 | Rees et al. |
| 2003/0144222 A1 | 7/2003 | Wang et al. |
| 2021/0040238 A1 | 2/2021 | Harada et al. |

FOREIGN PATENT DOCUMENTS

| CA | 2 988 587 A1 | 12/2016 |
| EP | 2 842 976 A1 | 3/2015 |

(Continued)

OTHER PUBLICATIONS

European Search Report, dated May 3, 2024, corresponding to EP Application No. 21850057.7.

(Continued)

*Primary Examiner* — Layla D Berry
(74) *Attorney, Agent, or Firm* — Ladas & Parry LLP; Malcolm J. MacDonald, Esq.

(57) ABSTRACT

The present invention provides a polymerizable unsaturated group-containing cyclodextrin derivative, which can be efficiently prepared with a higher yield and a higher purity, and which can be mass-produced.

The polymerizable unsaturated group-containing cyclodextrin derivative is represented by the following general formula (1).

[Chem. 1]

$$R^2-\underset{\underset{R^0}{|}}{N}-R^1 \quad (1)$$

(In the formula, $R^1$ represents any one of
(A) the following general formula (2)

$$-R^3-NH-R^4 \quad (2)$$

($R^3$ is an alkylene group having 3 to 20 carbon atoms, may be linear or branched, and may have a substituent.
$R^4$ represents a (meth)acryloyl group or a vinyl group-containing alkyl group having 3 to 50 carbon atoms.)
(B) the following general formula (3)

$$-R^5-NHCONH-R^6 \quad (3)$$

($R^5$ is an alkylene group having 3 to 20 carbon atoms, may be linear or branched, and may have a substituent.
$R^6$ represents a (meth)acryloyloxyalkyl group having 4 to 50 carbon atoms or a vinyl group-containing alkyl group having 3 to 50 carbon atoms), or
(C) the following general formula (4)

$$-R^5-OCONH-R^6 \quad (4)$$

($R^5$ and $R^6$ are the same as those described above.)
$R^2$ represents a hydrogen atom, an acyl group having 2 to 50 carbon atoms, or an alkyl group having 1 to 30 carbon atoms.
$R^c$ represents a group represented by the following general formula (5).

[Chem. 2]

(5)

(In the formula, $R^7$'s are the same as or different from each other, and each represent a hydrogen atom, an acyl group having 2 to 50 carbon atoms, an alkyl group having 1 to 30 carbon atoms, or —$CONHR^8$ ($R^8$ is an alkyl group having 1 to 20 carbon atoms), and 20% or more of $R^7$'s is any one of (Continued)

an acyl group having 2 to 50 carbon atoms, an alkyl group having 1 to 30 carbon atoms, or —$CONHR^8$. x is an integer of 5 to 7)).

3 Claims, 7 Drawing Sheets

(56) References Cited

FOREIGN PATENT DOCUMENTS

| EP | 3 590 972 A1 | 1/2020 |
|---|---|---|
| JP | 6624660 B1 | 12/2019 |

OTHER PUBLICATIONS

International Search Report, dated Sep. 7, 2021, corresponding to International Application No. PCT/JP2021/027276.
Kaya, Ethem et al., "Synthesis and Characterization of Physical Crosslinking Systems Based on Cyclodextrin Inclusion/Host-Guest Complexation", Journal of Polymer Science, Part A: Polymer Chemistry, 2010, vol. 48(3), pp. 581-592.
Pu, Wanfen et al., "Synthesis and evaluation of beta-cyclodextrin-functionalized hydrophobically associating polyacrylamide", RSC Advances, 2016, vol. 6(98), pp. 96006-96014.
Lin, Yuanjing et al., "Effect of fabrication strategy on the enantioseparation performance of beta-cyclodextrin-functionalized polymethacrylate monoliths: A comparative evaluation", Journal of Separation Science, 2017, vol. 40, No. 19, pp. 3754-3762.
Song, Meng-Meng et al., "Functional Nanostructured Materials (including low-D carbon)—Super Tough, Ultra-Stretchable Hydrogel with Multi-Stimuli Responsiveness" ACS Applied Materials & Interfaces, 2018, vol. 10, No. 17, pp. 15021-15029.

POLYMERIZABLE UNSATURATED GROUP-CONTAINING CYCLODEXTRIN DERIVATIVE

TECHNICAL FIELD

The present invention relates to a polymerizable unsaturated group-containing cyclodextrin derivative.

BACKGROUND ART

In recent years, supermolecular materials having various functionalities have been actively developed by skillfully utilizing non-covalent interaction represented by host-guest interaction using cyclodextrin derivatives. For example, a polymeric material having a self-healing property and excellent stretchability, and a host group-containing polymerizable monomer containing a cyclodextrin derivative as a host group, which is a raw material of the polymeric material, have been proposed (PTLs 1 and 2).

PTLs 1 and 2 describe a method of reacting a cyclodextrin with acrylamide in dimethylformamide (DMF) in the presence of a p-toluenesulfonic acid catalyst, purifying and collecting a crude product obtained by acetone reprecipitation with a column, and acetylating the monomer to obtain an acetyl-modified product. However, in such a preparation process, since the cost is too high, mass production may be difficult.

PTL 3 describes a bioactive agent carrier in which a cyclodextrin is grafted to a polyethylene glycol.

PTL 4 and N-PTLs 1 and 2 report a monomer in which a methacryl group is introduced into a cyclodextrin having an ethylenediamine moiety. However, the monomer does not modify a hydroxy group in the cyclodextrin, and has a problem in compatibility with other monomers to be copolymerized.

N-PTL 3 reports a monomer in which a methacryl group is introduced into a cyclodextrin having a diaminohexane moiety, and the monomer also has a problem in compatibility.

CITATION LIST

Patent Literature

PTL 1: JP-β-6624660
PTL 2: WO 2018/159791
PTL 3: JP-A-2005-517048
PTL 4: U.S. Pat. No. 8,569,451

Non-Patent Literature

N-PTL 1: Lin Yuanjing et. al, Journal of Separation Science, 2017, Vol. 40, No. 19, P. 3754-3762
N-PTL 2: Song Meng-Meng et. al, ACS Applied Materials & Interfaces, 2018, Vol. 10, No. 17, P. 15021-15029
N-PTL 3: Kaya Ethem et. al, Journal of Polymer Science: part A, 2010, Vol. 48, P. 581-592

SUMMARY OF INVENTION

Technical Problem

An object of the present invention is to provide a polymerizable unsaturated group-containing cyclodextrin derivative, which can be efficiently prepared with a higher yield and a higher purity, and which can be mass-produced.

Solution to Problems

The present invention relates to a polymerizable unsaturated group-containing cyclodextrin derivative represented by the following general formula (1).

[Chem. 1]

$$R^2-N-R^1 \atop | \atop R^0 \qquad (1)$$

(In the formula, $R^1$ represents any one of
(A) the following general formula (2)

$$-R^3-NH-R^4 \qquad (2)$$

($R^3$ is an alkylene group having 3 to 20 carbon atoms, may be linear or branched, and may have a substituent.
$R^4$ represents a (meth)acryloyl group or a vinyl group-containing alkyl group having 3 to 50 carbon atoms.)
(B) the following general formula (3)

$$-R^5-NHCONH-R^6 \qquad (3)$$

($R^5$ is an alkylene group having 3 to 20 carbon atoms, may be linear or branched, and may have a substituent.
$R^6$ represents a (meth)acryloyloxyalkyl group having 4 to 50 carbon atoms or a vinyl group-containing alkyl group having 3 to 50 carbon atoms), or
(C) the following general formula (4)

$$-R^5-OCONH-R^6 \qquad (4)$$

($R^5$ and $R^6$ are the same as those described above.)
$R^2$ represents a hydrogen atom, an acyl group having 2 to 50 carbon atoms, or an alkyl group having 1 to 30 carbon atoms.
$R^c$ represents a group represented by the following general formula (5).

[Chem. 2]

$$(5)$$

(In the formula, $R^7$'s are the same as or different from each other, and each represent a hydrogen atom, an acyl group having 2 to 50 carbon atoms, an alkyl group having 1 to 30 carbon atoms, or $-CONHR^8$ ($R^8$ is an alkyl group having 1 to 20 carbon atoms), and 20% or more of $R^7$'s is any one of an acyl group having 2 to 50 carbon atoms, an alkyl group having 1 to 30 carbon atoms, or $-CONHR^8$. x is an integer of 5 to 7))

According to the present invention, the alkyl group is preferably a methyl group.

According to the present invention, the acyl group is preferably an acetyl group.

In addition, the present invention relates to a method for preparing a polymerizable unsaturated group-containing cyclodextrin derivative, the method including:

(1) reacting mono-6-tosyl-cyclodextrin with a diaminoalkyl compound (having 3 to 20 carbon atoms) to obtain a monoamino compound;

(2) reacting the obtained monoamino compound with (meth)acrylic anhydride to obtain a (meth)acrylamide group-containing cyclodextrin; and (3) reacting the obtained (meth)acrylamide group-containing cyclodextrin with an acid anhydride to obtain an acylated product, in which the polymerizable unsaturated group-containing cyclodextrin derivative is represented by the following general formula (6).

[Chem. 3]

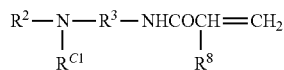

(6)

(In the formula, $R^2$ represents a hydrogen atom or an acyl group having 2 to 50 carbon atoms. $R^3$ is an alkylene group having 3 to 20 carbon atoms, may be linear or branched, and may have a substituent.

$R^8$ represents a hydrogen group or a methyl group.

$R^{C1}$ represents a group represented by the following general formula (5a).

[Chem. 4]

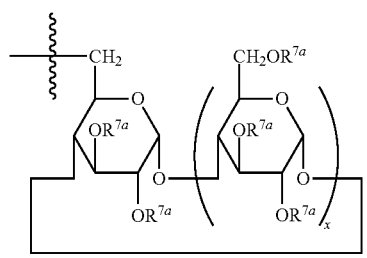

(5a)

(In the formula, $R^7a$'s are the same as or different from each other, and each represent a hydrogen atom or an acyl group having 2 to 50 carbon atoms. x is 5 to 7.))

In addition, the present invention relates to a method for preparing a polymerizable unsaturated group-containing cyclodextrin derivative, the method including:

(a) reacting mono-6-tosyl-cyclodextrin with an alkyl halide (having 1 to 30 carbon atoms) to obtain an alkylated product;

(b) reacting the obtained alkylated product with a diaminoalkyl compound (having 3 to 20 carbon atoms) to obtain a monoamino compound; and (c) reacting the obtained monoamino compound with (meth)acrylic anhydride to obtain a (meth)acrylamide group-containing cyclodextrin, in which the polymerizable unsaturated group-containing cyclodextrin derivative is represented by the following general formula (7).

[Chem. 5]

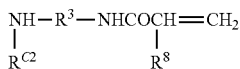

(7)

(In the formula, $R^3$ is an alkylene group having 3 to 20 carbon atoms, may be linear or branched, and may have a substituent.

$R^8$ represents a hydrogen group or a methyl group.

$R^{C2}$ represents a group represented by the following general formula (5b).

[Chem. 6]

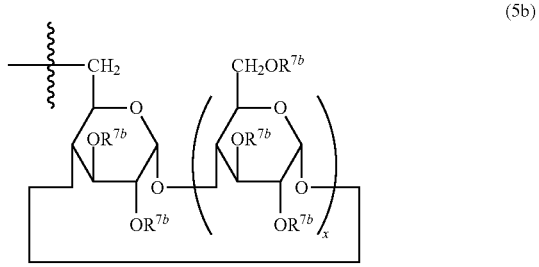

(5b)

(In the formula, $R^{7b}$'s are the same as or different from each other, and each represent a hydrogen atom or an alkyl group having 1 to 30 carbon atoms. x is 5 to 7.))

Further, the present invention relates to a method for preparing a polymerizable unsaturated group-containing cyclodextrin derivative, the method including:

(A) reacting mono-6-tosyl-cyclodextrin with an alkyl halide to obtain an alkylated product;

(B) reacting the obtained alkylated product with a diaminoalkyl compound (having 3 to 20 carbon atoms) to obtain an amino compound; and (C) reacting the obtained amino compound with a (meth)acryloyloxyalkyl isocyanate to obtain a (meth)acryloyloxyalkyl group-containing cyclodextrin, in which the polymerizable unsaturated group-containing cyclodextrin derivative is represented by the following general formula (8).

[Chem. 7]

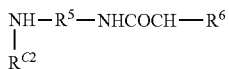

(8)

(In the formula, $R^5$ is an alkylene group having 3 to 20 carbon atoms, may be linear or branched, and may have a substituent.

$R^6$ represents a (meth)acryloyloxyalkyl group.

$R^{C2}$ represents a group represented by the following general formula (5b).

[Chem. 8]

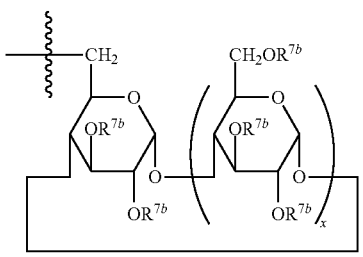

(In the formula, $R^{7b}$'s are the same as or different from each other, and each represent a hydrogen atom or an alkyl group having 1 to 30 carbon atoms. x is 5 to 7.))

Advantageous Effects of Invention

The present invention can provide a polymerizable unsaturated group-containing cyclodextrin derivative, which can be efficiently prepared with a higher yield and a higher purity, and which can be mass-produced.

DESCRIPTION OF EMBODIMENTS

Figure 1:
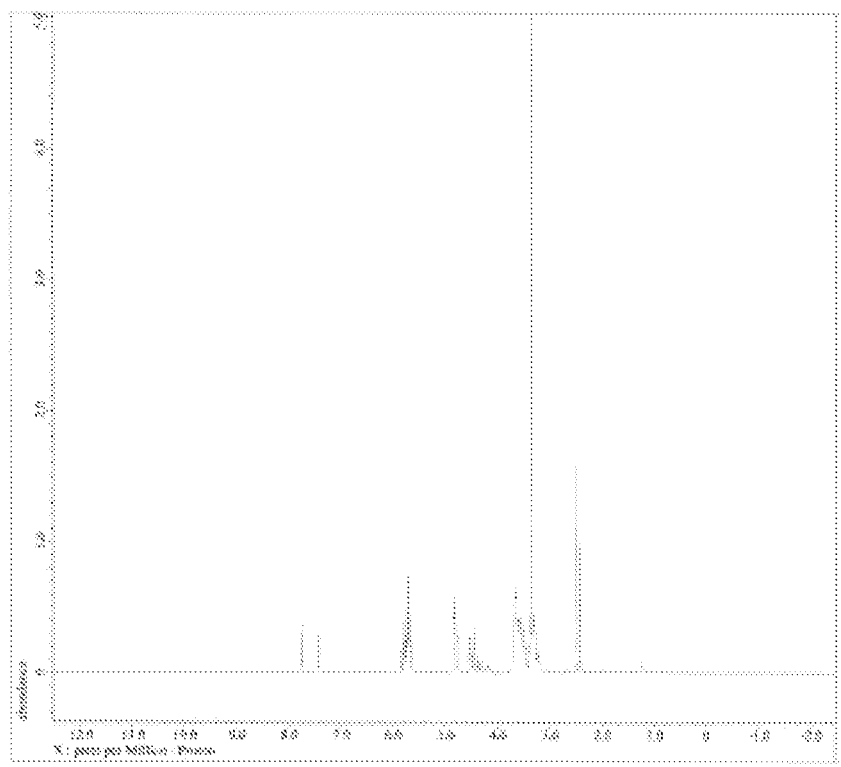
FIG. 1 is a $^1$H-NMR chart of a compound A obtained in Synthesis Example 1.

A polymerizable unsaturated group-containing cyclodextrin derivative according to the present invention is represented by the following general formula (1). In the present description, the "polymerizable unsaturated group-containing cyclodextrin derivative" may be referred to as a "cyclodextrin derivative" for convenience.

[Chem. 9]

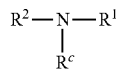  (1)

(In the formula, $R^1$ represents any one of
(A) the following general formula (2)

  (2)

($R^3$ is an alkylene group having 3 to 20 carbon atoms, may be linear or branched, and may have a substituent.
$R^4$ represents a (meth)acryloyl group or a vinyl group-containing alkyl group having 3 to 50 carbon atoms.)

(B) the following general formula (3)

  (3)

($R^5$ is an alkylene group having 3 to 20 carbon atoms, may be linear or branched, and may have a substituent.
$R^6$ represents a (meth)acryloyloxyalkyl group having 4 to 50 carbon atoms or a vinyl group-containing alkyl group having 3 to 50 carbon atoms), or
(C) the following general formula (4)

—$R^5$—OCONH—$R^6$  (4)

($R^5$ and $R^6$ are the same as those described above.)
$R^2$ represents a hydrogen atom, an acyl group having 2 to 50 carbon atoms, or an alkyl group having 1 to 30 carbon atoms.
$R^c$ represents a group represented by the following general formula (5).

[Chem. 10]

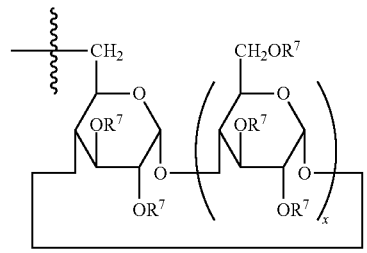  (5)

(In the formula, $R^7$'s are the same as or different from each other, and each represent a hydrogen atom, an acyl group having 2 to 50 carbon atoms, an alkyl group having 1 to 30 carbon atoms, or —CONHR$^8$ ($R^8$ is an alkyl group having 1 to 20 carbon atoms), and 20% or more of $R^7$'s is any one of an acyl group having 2 to 50 carbon atoms, an alkyl group having 1 to 30 carbon atoms, or —CONHR$^8$. x is an integer of 5 to 7))

The cyclodextrin derivative according to the present invention is a compound containing a polymerizable unsaturated group and $R^C$ represented by the general formula (5).

According to the present invention, a cyclodextrin derivative with a high yield and a high purity can be obtained at a low cost.

The $R^C$ can function as a host group, and is a monovalent group obtained by removing one hydroxy group from a molecule of a cyclodextrin having a structure substituted with another organic group. The cyclodextrin is at least one selected from the group consisting of α-cyclodextrin, β-cyclodextrin, and γ-cyclodextrin. In the present invention, β-cyclodextrin is suitable in terms of synthesis, choice of a guest molecule, and the like.

In the present description, the "molecule of a cyclodextrin having a structure substituted with another organic group" may be referred to as a "Cyclodextrin" for convenience.

The removed hydroxy group is preferably a primary hydroxy group from the viewpoint of ease of synthesis due to reactivity.

The $R^C$ has a structure in which 20% or more of hydrogen atoms ($R^7$) in the hydroxy group of the cyclodextrin are substituted with at least one group selected from the group consisting of an acyl group, an alkyl group, and —CONHR$^8$. In the $R^c$, a specific amount of the hydrogen atom in the hydroxy group contained in the cyclodextrin may be substituted with only an acyl group, may be substituted with only an alkyl group, or may be substituted with only —CONHR⁸.

In the present description, "at least one group selected from the group consisting of an acyl group, an alkyl group, and —CONHR⁸" may be referred to as an "acyl group or the like" for convenience.

Examples of the acyl group include an acetyl group, a propionyl group, a butyloyl group, and a formyl group. The acyl group may further have a substituent. The acyl group is preferably an acetyl group from the viewpoint that a cyclodextrin derivative exhibits a high affinity to both a hydrophilic polymerizable monomer and a hydrophobic polymerizable monomer, and a polymer is likely to form host-guest interaction.

The number of carbon atoms in the alkyl group is not particularly limited. The alkyl group preferably has 1 to 4 carbon atoms from the viewpoint that the cyclodextrin derivative is likely to be dissolved in other polymerizable monomers used in combination with the cyclodextrin derivative and the cyclodextrin derivative is likely to form host-guest interaction.

Specific examples of the alkyl group having 1 to 4 carbon atoms include a methyl group, an ethyl group, a propyl group, and a butyl group. When a hydrocarbon group is a propyl group and a butyl group, the hydrocarbon group may be linear or branched. The alkyl group may have a substituent as long as the effects of the present invention are not impaired. In view of design of a polymer, in order to control the polymer to an optimum polarity between hydrophilicity and hydrophobicity, the number of carbon atoms may be appropriately selected or a plurality of alkyl groups may be combined.

Among these, the alkyl group is preferably a methyl group from the viewpoints of synthesis and design in compatibility with other polymerizable monomers.

—CONHR⁸ is preferably a methyl carbamate group or an ethyl carbamate group. —CONHR⁸ is preferably an ethyl carbamate group from the viewpoint that the cyclodextrin derivative is likely to be dissolved in other polymerizable monomers used in combination with the cyclodextrin derivative and a polymer formed of the cyclodextrin derivative is likely to form host-guest interaction.

Here, when the total number of hydroxy groups contained in one molecule of a cyclodextrin is N, α-cyclodextrin has N=18, β-cyclodextrin has N=21, and γ-cyclodextrin has N=24.

In the cyclodextrin, the hydrogen atoms in up to N−1 hydroxy groups per molecule may be substituted with an acyl group or the like.

It is preferred that the $R^c$ has a structure in which hydrogen atoms in 20% or more of hydroxy groups in the total number N−1 of hydroxy groups contained in one molecule of the Cyclodextrin are substituted with the acyl group or the like. In this case, the cyclodextrin derivative is likely to be dissolved in other polymerizable monomers used in combination with the cyclodextrin derivative. It is more preferred that the $R^c$ has a structure in which hydrogen atoms in 50% or more of hydroxy groups in the total number N−1 of hydroxy groups contained in one molecule of the Cyclodextrin are substituted with the acyl group or the like, and it is particularly preferred that the $R^c$ has a structure in which hydrogen atoms in 80% or more of hydroxy groups in the total number N−1 of hydroxy groups are substituted with the acyl group or the like.

It is preferred that the $R^c$ has a structure in which hydrogen atoms in 4 or more hydroxy groups in the total number N−1 of hydroxy groups contained in one molecule of α-Cyclodextrin are substituted with the acyl group or the like. In this case, the cyclodextrin derivative is likely to be dissolved in other polymerizable monomers used in combination with the cyclodextrin derivative. It is more preferred that the $R^c$ has a structure in which hydrogen atoms in 9 or more hydroxy groups in the total number N−1 of hydroxy groups contained in one molecule of α-Cyclodextrin are substituted with the acyl group or the like, and it is particularly preferred that the $R^c$ has a structure in which hydrogen atoms in 14 hydroxy groups in the total number N−1 of hydroxy groups are substituted with the acyl group or the like.

It is preferred that the $R^c$ has a structure in which hydrogen atoms in 4 or more hydroxy groups in the total number N−1 of hydroxy groups contained in one molecule of β-Cyclodextrin are substituted with the acyl group or the like. In this case, the cyclodextrin derivative is likely to be dissolved in other polymerizable monomers used in combination with the cyclodextrin derivative. It is more preferred that the $R^c$ has a structure in which hydrogen atoms in 10 or more hydroxy groups in the total number N−1 of hydroxy groups contained in one molecule of β-Cyclodextrin are substituted with the acyl group or the like, and it is particularly preferred that the $R^c$ has a structure in which hydrogen atoms in 16 or more hydroxy groups in the total number N−1 of hydroxy groups are substituted with the acyl group or the like.

It is preferred that the $R^c$ has a structure in which hydrogen atoms in 5 or more hydroxy groups in the total number N−1 of hydroxy groups contained in one molecule of γ-Cyclodextrin are substituted with the acyl group or the like. In this case, the cyclodextrin derivative is likely to be dissolved in other polymerizable monomers used in combination with the cyclodextrin derivative. It is more preferred that the $R^c$ has a structure in which hydrogen atoms in 12 or more hydroxy groups in the total number N−1 of hydroxy groups contained in one molecule of a γ-cyclodextrin derivative are substituted with the acyl group or the like, and it is particularly preferred that the $R^c$ has a structure in which hydrogen atoms in 19 or more hydroxy groups in the total number N−1 of hydroxy groups are substituted with the acyl group or the like.

Next, in the cyclodextrin derivative according to the present invention, the $R^1$ containing a polymerizable unsaturated group and $R^C$ are linked to each other via a nitrogen atom derived from an amino group, as shown in the general formula (1).

In the general formula (1), as one example, $R^1$ is represented by (A) the following general formula (2):

$$—R^3—NH—R^4 \qquad (2)$$

($R^3$ is an alkylene group having 3 to 20 carbon atoms, may be linear or branched, and may have a substituent.

$R^4$ represents a (meth)acryloyl group or a vinyl group-containing alkyl group having 3 to 50 carbon atoms).

Thus, the cyclodextrin derivative having a structure represented by the general formula (2) has a structure derived from a diaminoalkyl compound, which is $R^2$—N—$R^3$—NH—.

According to the present invention, it is not preferred in terms of toxicity that a diaminoalkyl compound to be used in the preparation of the cyclodextrin derivative has a too small number of carbon atoms in the alkyl group. In addition, it is also not preferred in terms of function exhibition since a degree of freedom of molecules including steric hindrance is reduced when a distance between a main chain and a cyclodextrin during polymerization of the cyclodextrin derivative according to the present invention is too short. On the other hand, it is not preferred that the number of carbon atoms is too large in consideration of synthesis (in particular, a purification step including reprecipitation or recrystallization) or raw material procurement, or due to a concern about deterioration in functional exhibition and physical properties resulting from too far distance between the main chain and the cyclodextrin during polymerization. From the above, the number of carbon atoms in the diaminoalkyl group $R^3$ is preferably 3 to 20. The number of carbon atoms is more preferably 3 to 10, and still more preferably 3 to 5.

The $R^4$ is a functional group exhibiting radical polymerizability, and examples thereof include an acryloyl group ($CH_2$=$CH(CO)$—) and a methacryloyl group ($CH_2$=$CCH_3$($CO$)—). In this case, each group having a carbon-carbon double bond may further have a substituent as long as the radical polymerizability is not inhibited.

In addition, $R^4$ may be a vinyl group-containing alkyl group having 3 to 50 carbon atoms.

In the general formula (1), $R^1$ may represent (B) the following general formula (3):

—$R^5$—NHCONH—$R^6$      (3)

($R^5$ is an alkylene group having 2 to 20 carbon atoms, may be linear or branched, and may have a substituent.

$R^6$ represents a (meth)acryloyloxyalkyl group having 4 to 50 carbon atoms or a vinyl group-containing alkyl group having 3 to 50 carbon atoms.)

As shown in the general formula (3), the cyclodextrin derivative contains a functional group exhibiting radical polymerizability via a urea bond, and has a structure containing a (meth)acryloyloxyalkyl group or a vinyl group-containing alkyl group.

An alkyl group in the (meth)acryloyloxyalkyl group preferably has 1 to 10 carbon atoms, and specific examples thereof include a structure derived from an isocyanate such as 2-methacryloyloxyethyl isocyanate and 2-acryloyloxyethyl isocyanate.

The number of carbon atoms in the diaminoalkyl group $R^5$ is preferably 3 to 20 for the same reason as the $R^3$. The number of carbon atom is more preferably 3 to 10.

In the general formula (1), $R^1$ may represent (C) the following general formula (4):

—$R^5$—OCONH—$R^6$      (4)

($R^5$ and $R^6$ are the same as those described above.)

As shown in the general formula (4), the cyclodextrin derivative contains a functional group exhibiting radical polymerizability via a urethane bond, and has a structure containing a (meth)acryloyloxyalkyl group or a vinyl group-containing alkyl group.

A method for preparing the cyclodextrin derivative according to the present invention is not limited, and the cyclodextrin derivative according to the present invention can be appropriately prepared based on each structure thereof.

For example, when the cyclodextrin derivative represented by the general formula (6) is to be prepared, a preparation method based on the following reaction formula is exemplified.

[Chem. 11]

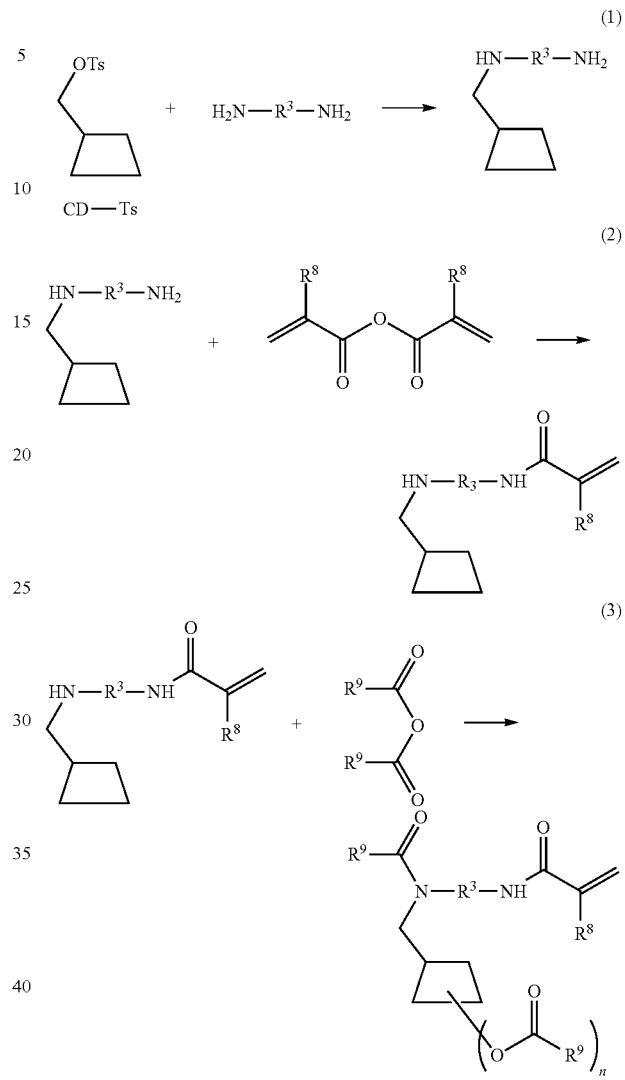

(In the formula, $R^3$ is an alkylene group having 3 to 20 carbon atoms, may be linear or branched, and may have a substituent.

$R^8$ represents a hydrogen group or a methyl group.

$R^9$ represents an alkylene group having 1 to 49 carbon atoms.)

For example, first, mono-6-tosyl-β-cyclodextrin (β-CD-Ts) obtained by tosylating one primary hydroxy group in a cyclodextrin by using a known method is reacted with a diaminoalkyl compound to substitute a tosyl group, thereby obtaining a monoamino compound (step (1)).

Mono-6-tosyl-β-cyclodextrin obtained by tosylating one primary hydroxy group in a cyclodextrin to be used in the present invention can be obtained by using a known method. That is, mono-6-tosyl-β-cyclodextrin can be obtained by reprecipitation or recrystallization after a reaction of p-toluenesulfonic acid chloride with a cyclodextrin under a predetermined condition. In addition, by using p-toluenesulfonic anhydride instead of p-toluenesulfonic acid chloride, mono-6-tosyl-β-cyclodextrin can be obtained in the same manner.

Further, α-cyclodextrin and γ-cyclodextrin can also be expected to be obtained in the same manner by examining conditions of recrystallization or reprecipitation.

Next, the monoamino compound is reacted with (meth) acrylic anhydride to obtain a (meth)acrylamide group-containing cyclodextrin (step (2)). The reaction is preferably performed using an aprotic polar solvent such as N,N-dimethylformamide (DMF) in the presence of a base such as triethylamine.

Further, a hydrogen atom in a hydroxy group or an amino group contained in the (meth)acrylamide group-containing cyclodextrin is substituted with an acyl group to obtain an acylated product (step (3)). Examples of the method include a method in which, in the presence of an acid anhydride, the (meth)acrylamide group-containing cyclodextrin is acylated using N,N-dimethyl-4-aminopyridine (DMAP) or the like as a catalyst, using triethylamine or the like as a base, and using a solvent capable of dissolving all the above substances, such as DMF.

Specifically, for example, in the case of acetylation, acetic anhydride may be used, and acetate chloride or the like may be used instead of acetic anhydride.

In addition, pyridine, which is a base and a catalyst, may be used instead of the DMAP and the triethylamine.

In the reaction formula, n represents an integer corresponding to 20% or more of the total number N−1 of hydroxy groups contained in one molecule of the cyclodextrin.

As another method of substituting a hydrogen atom in a hydroxy group contained in a cyclodextrin with an acyl group such as an acetyl group, a known acylation reaction can be widely adopted, and for example, the substitution with an acetyl group can be performed by using a method of reacting an acetyl halide with the (meth)acrylamide group-containing cyclodextrin in the presence of sodium hydride. In this case, a method of adding dropwise a solution of an acetyl halide and the (meth)acrylamide group-containing cyclodextrin to a suspension of sodium hydride can be adopted. Alternatively, a method of mixing an acetyl halide, the (meth)acrylamide group-containing cyclodextrin, and sodium hydride at once can also be adopted. Examples of the acetyl halide include acetyl bromide and acetyl iodide.

The cyclodextrin derivative obtained as described above can be efficiently prepared with a higher yield and a higher purity by reprecipitation or recrystallization.

As a method of substituting a hydrogen atom in a hydroxy group contained in the cyclodextrin with —CONHR$^8$, for example, a known alkyl carbamation reaction can be widely adopted. For example, by reacting the polymerizable monomer in an organic solvent (for example, DMSO) in the presence of an alkyl isocyanate, a hydrogen atom in a hydroxy group contained in a host group can be substituted with —CONHR$^8$. Examples of the alkyl isocyanate include methyl isocyanate and ethyl isocyanate.

The cyclodextrin derivative according to the present invention can also be prepared, for example, based on the following reaction formula when the cyclodextrin derivative represented by the general formula (7) is to be prepared.

[Chem. 12]

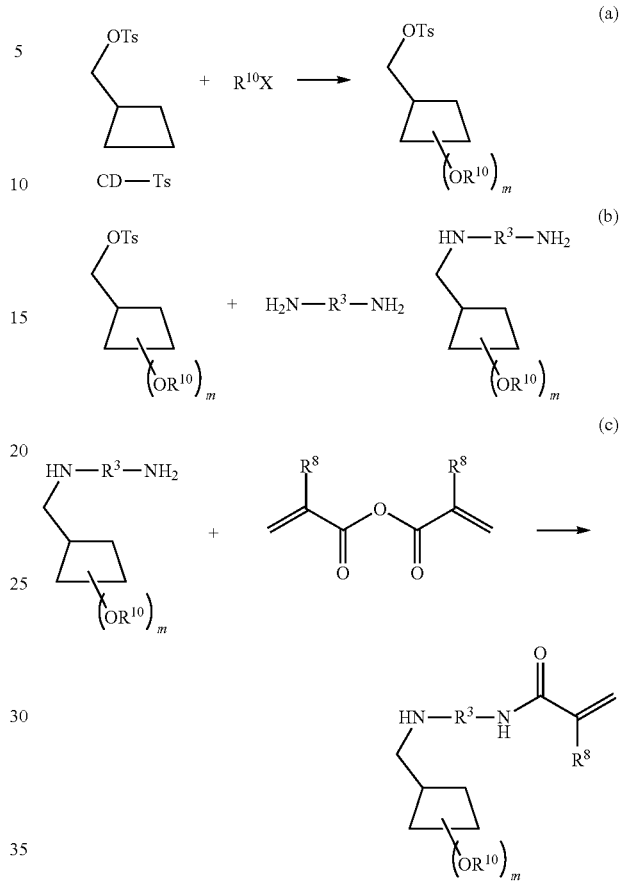

(In the formula, R$^3$ and R$^8$ are the same as those described above.

R$^{10}$ represents an alkyl group having 1 to 30 carbon atoms, and X represents a halogen atom.)

For example, first, in a method of reacting mono-6-tosyl-β-cyclodextrin obtained by tosylating a primary hydroxy group in a cyclodextrin by using the above-described method with an alkyl halide in the presence of sodium hydride or sodium hydroxide, a compound in which a hydrogen atom in a hydroxy group of a tosylated cyclodextrin is substituted with an alkyl group is obtained (step (a)).

In the reaction formula, m represents an integer corresponding to 20% or more of the total number N−1 of hydroxy groups contained in one molecule of a cyclodextrin.

As a method of substituting the hydrogen atom in the hydroxy group contained in the tosylated cyclodextrin with an alkyl group, a known alkylation reaction can be widely adopted. For example, the substitution with an alkyl group can be performed by using a method of reacting an alkyl halide with the tosylated cyclodextrin in the presence of sodium hydride or sodium hydroxide. When sodium hydroxide is used, a method of adding dropwise a solution of an alkyl halide and the tosylated cyclodextrin to a suspension of sodium hydroxide can be adopted. Alternatively, a method of mixing an alkyl halide, the tosylated cyclodextrin, and sodium hydroxide at once can also be adopted. Examples of the alkyl halide include methyl iodide, ethyl iodide, and propyl iodide.

Next, the compound obtained in step (a) is reacted with a diamine alkyl compound to substitute a tosyl group, thereby obtaining a monoamino compound (step (b)).

Further, the obtained monoamino compound is reacted with a (meth)acrylic anhydride to obtain a (meth)acrylamide group-containing cyclodextrin derivative (step (c)). The reaction is preferably performed using an aprotic polar solvent such as N,N-dimethylformamide (DMF) in the presence of a base such as triethylamine.

The obtained cyclodextrin derivative can be efficiently prepared with a higher yield and a higher purity by reprecipitation or recrystallization.

The cyclodextrin derivative according to the present invention can also be prepared, for example, based on the following reaction formula when the cyclodextrin derivative represented by the general formula (8) is to be prepared.

[Chem. 13]

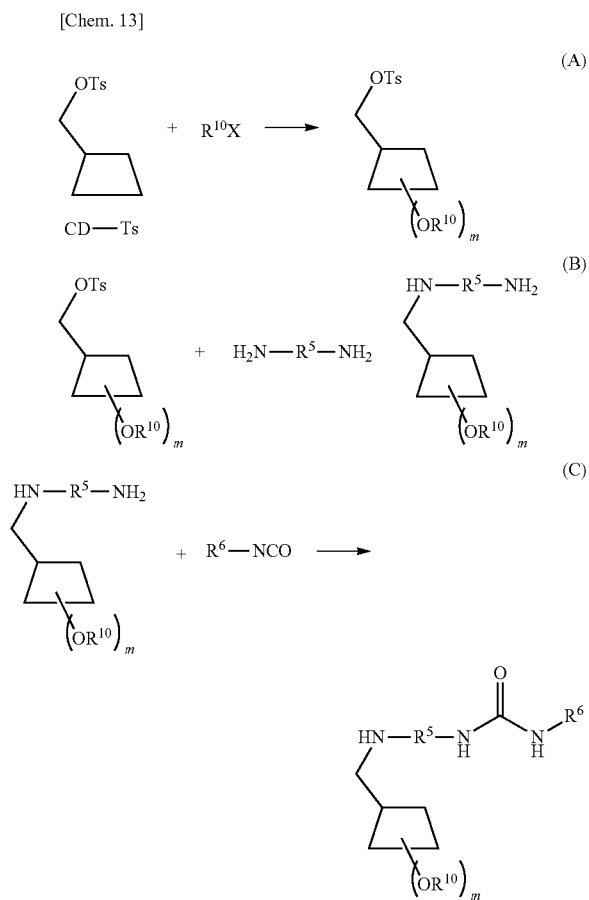

(In the formula, $R^5$ is an alkylene group having 3 to 20 carbon atoms, may be linear or branched, and may have a substituent.

$R^6$ represents a (meth)acryloyloxyalkyl group having 4 to 50 carbon atoms.

$R^{10}$ is the same as that described above.)

For example, first, in a method of reacting mono-6-tosyl-cyclodextrin obtained by tosylating a primary hydroxy group in a cyclodextrin by using the above-described method with an alkyl halide in the presence of sodium hydride or sodium hydroxide, a compound in which a hydrogen atom in a hydroxy group of a tosylated cyclodextrin is substituted with an alkyl group is obtained (step (A)).

In the reaction formula, m represents an integer corresponding to 20% or more of the total number N–1 of hydroxy groups contained in one molecule of a cyclodextrin.

As a method of substituting the hydrogen atom in the hydroxy group contained in the tosylated cyclodextrin with an alkyl group, a known alkylation reaction can be widely adopted. For example, the substitution with an alkyl group can be performed by using a method of reacting an alkyl halide with the tosylated cyclodextrin in the presence of sodium hydride or sodium hydroxide. When sodium hydroxide is used, a method of adding dropwise a solution of an alkyl halide and the tosylated cyclodextrin to a suspension of sodium hydroxide can be adopted. Alternatively, a method of mixing an alkyl halide, the tosylated cyclodextrin, and sodium hydroxide at once can also be adopted. Examples of the alkyl halide include methyl iodide, ethyl iodide, and propyl iodide.

Next, the compound obtained in step (A) is reacted with a diamine alkyl compound to substitute a tosyl group, thereby obtaining a monoamino compound (step (B)).

Further, the obtained monoamino compound is reacted with an isocyanate to obtain a (meth)acryloyloxyalkyl group-containing cyclodextrin derivative (step (C)).

Examples of the isocyanate include 2-methacryloyloxyethyl isocyanate and 2-acryloyloxyethyl isocyanate.

The obtained cyclodextrin derivative can be efficiently prepared with a higher yield and a higher purity by reprecipitation or recrystallization.

In addition, as a method for preparing the polymerizable unsaturated group-containing cyclodextrin derivative via a urethane bond in which $R^1$ in the general formula (1) is represented by the general formula (4), for example, there may be considered a method in which a hydrogen atom in a hydroxy group of a tosylated cyclodextrin is substituted with an alkyl group in the same manner as in the method of alkylating a hydrogen atom in a hydroxy group of the cyclodextrin, then the obtained alkylated product is reacted with an amino alcohol compound to substitute a tosyl group to obtain an alcohol compound, and further the alcohol compound is reacted with the isocyanate to obtain a (meth)acryloyloxyalkyl group-containing cyclodextrin derivative.

The cyclodextrin derivative according to the invention may be a raw material for obtaining a polymer contained in a polymeric material. The polymer obtained using the cyclodextrin derivative may have, for example, a structure in which molecules are crosslinked by reversible host-guest interaction.

Alternatively, the polymer obtained using the cyclodextrin derivative may be, for example, a movable crosslinked polymer to be described later. As will be described later, examples of the movable crosslinked polymer include a polymer having a structure formed by allowing a main chain of a polymer to penetrate a ring of a host group (a cyclic molecule having a cyclodextrin structure) in a side chain of another polymer.

The cyclodextrin derivative according to the present invention can exhibit a high affinity to, for example, both a hydrophilic polymerizable monomer and a hydrophobic polymerizable monomer, and the cyclodextrin derivative is copolymerizable with various polymerizable monomers.

In particular, since the cyclodextrin derivative according to the present invention exhibits a high solubility in a hydrophobic polymerizable monomer, copolymerization of a host group-containing polymerizable monomer and a hydrophobic polymerizable monomer, which is considered to be difficult in the related art, can be performed in a wide composition ratio, and a degree of freedom in design of a target polymeric material can be increased.

The cyclodextrin derivative according to the present invention can be used as a radiation (ultraviolet) curable resin composition by being used in combination with other radiation (ultraviolet) polymerizable compounds.

EXAMPLES

Hereinafter, the present invention will be described in detail with reference to Examples. The present invention is not limited to the following Examples.

Synthesis Example 1

To a flask equipped with a cooling tube and a stirring rod, 400 g of water, 44.78 g of β-cyclodextrin, and 18.86 g of p-toluenesulfonic anhydride were charged, and the mixture was stirred at 30° C. for 2 hours. 40.00 g of a 48% sodium hydroxide aqueous solution was added thereto, and the mixture was further stirred for 10 minutes. Then, the resultant was filtered through a 400-mesh, and the filtrate was neutralized with hydrochloric acid to pH 7, and allowed to stand overnight. The resultant was filtered and sufficiently washed with water to obtain 12.77 g of mono-tosylated β-cyclodextrin (compound A).

A $^1$H-NMR chart at this time was shown in FIG. 1 ($^1$H NMR (DMSO-$d_6$): 2.43 (s, 3H), 3.22-3.65 (m, overlaps with HOD), 4.16-4.53 (m, 6H), 4.76-4.85 (m, 7H), 5.64-5.85 (m, 14H), 7.43 (d, J=8.00 Hz, 2H), 7.75 (d, J=8.00 Hz, 2H)).

It was confirmed that a purity was >99% based on an integral value of $^1$H NMR.

Synthesis Example 2

To a flask equipped with a cooling tube and a stirring rod, 40 g of the compound A obtained in Synthesis Example 1 and 184 g (80 equivalents) of 1,3-propanediamine were charged, and the mixture was heated and stirred at 70° C. for 4 hours. Then, the reactant was charged into 1,700 g of a mixed solvent containing methanol: acetone=1:3, and the mixture was allowed to stand overnight. The resultant was filtered and washed with a mixed solvent containing methanol: acetone=1:3 to obtain 11.4 g of mono-aminated β-cyclodextrin (compound B).

Figure 2:
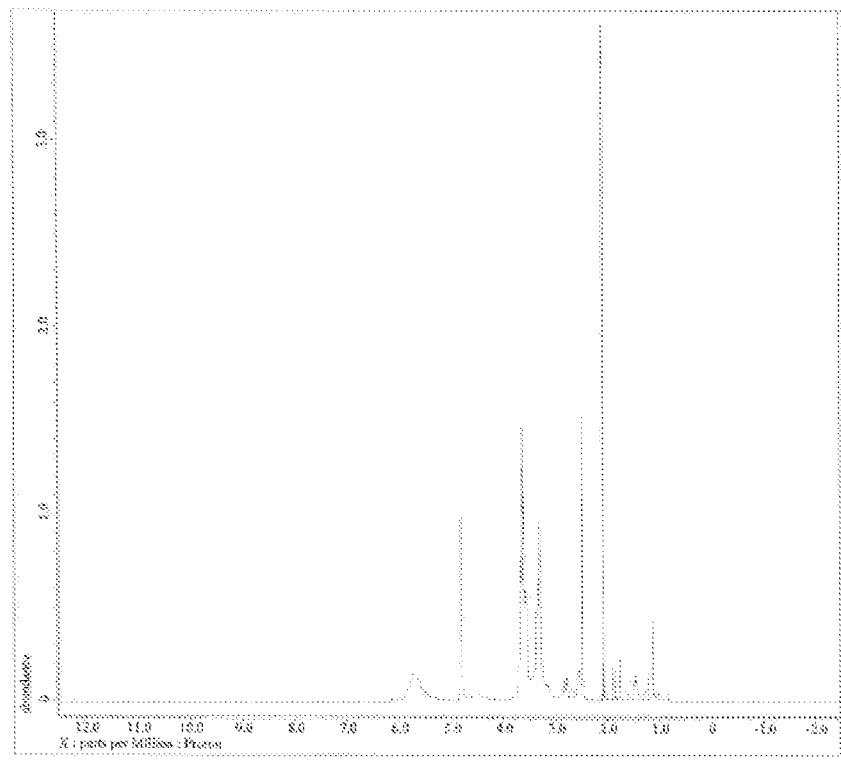
FIG. 2 is a $^1$H-NMR chart of a compound B obtained in Synthesis Example 2.

A $^1$H-NMR chart at this time was shown in FIG. 2 (characteristic peak $^1$H NMR (DMSO-$d_6$): 1.12-1.14 (m, 2H), 1.23-1.29 (m, 1H), 1.44-1.46 (m, 2H), 2.56-2.81 (m, 4H), 3.14-3.38 (m, 16H), 3.59-3.65 (m, 26H), 4.51 (br, 6H), 4.82 (s, 7H), 5.72 (br, 14H)).

It was confirmed that a purity was 98.6% based on an integral value of $^1$H NMR.

Synthesis Example 3

To a flask equipped with a cooling tube and a stirring rod, 11.4 g of the compound B obtained in Synthesis Example 2, 16 g of N,N-dimethylformamide, and 1 g of triethylamine were charged and dissolved, a mixture containing 1 g of N,N-dimethylformamide and 1.5 g of methacrylic anhydride was added thereto, and the obtained mixture was stirred at room temperature (25° C.) for 3 hours.

35 g of triethylamine was added thereto, then 27 g of acetic anhydride and 0.2 g of DMAP were added thereto, and the mixture was stirred at 60° C. for 3 hours. The reactant was cooled, charged into 190 g of water, and allowed to stand overnight. Then, the reactant was filtered to obtain 18 g of acetylated methacrylamide group-containing β-cyclodextrin (compound C).

Figure 3:
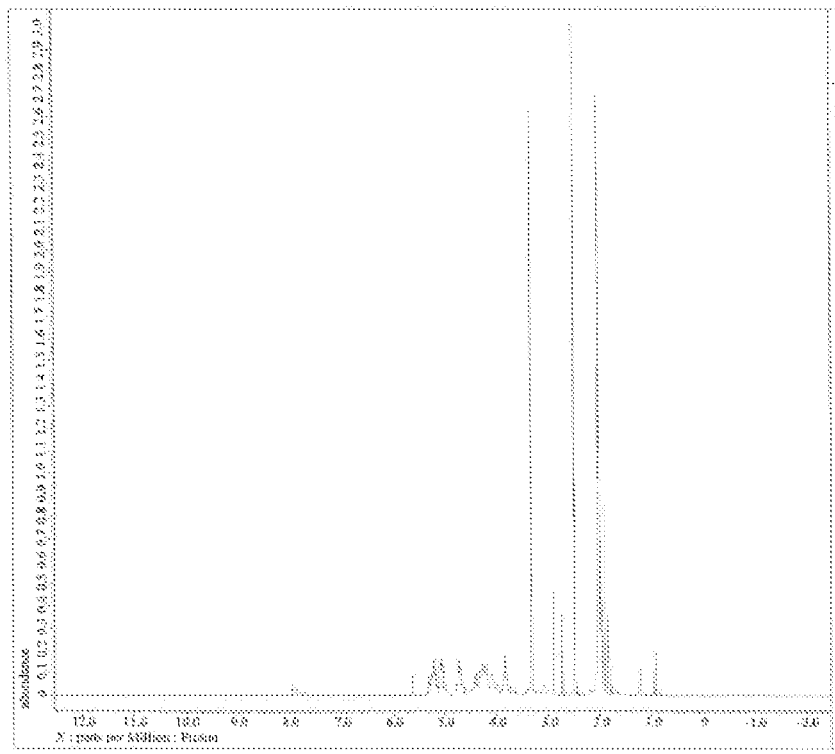
FIG. 3 is a $^1$H-NMR chart of a compound C obtained in Synthesis Example 3.

A $^1$H-NMR chart at this time was shown in FIG. 3 (characteristic peak $^1$H NMR (DMSO-$d_6$): 1.06-1.56 (m, 1H), 1.61-2.01 (m, 69H), 2.80-2.94 (m, 2H), 3.65-3.72 (m, 8H), 3.82-4.03 (m, 5H), 4.04-4.02 (m, 15H), 4.55-4.58 (m, 7H), 4.89-4.91 (m, 7H), 4.92-5.05 (m, 8H), 5.45 (s, 1H), 7.63 (t, J=6.0 Hz, 1H)).

It was confirmed that a purity was 98.6% based on an integral value of $^1$H NMR.

In addition, since a $^1$H NMR peak (5.72 (br, 14H)) of a secondary hydroxy group had disappeared, a degree of modification of the hydroxy group was 90% or more.

Synthesis Example 4

In a flask equipped with a stirring rod, 60 g of N,N-dimethylformamide and 2.4 g of caustic soda (powder) were mixed and stirred, and 3.0 g of the compound A obtained in Synthesis Example 1 was charged thereto. 35 g of methyl iodide was added in several batches with ice cooling, and the mixture was stirred for 1 to 3 hours. The reactant was charged with 400 g of water, and allowed to stand overnight. Then, the reactant was filtered to obtain 0.9 g of methyl-etherified mono-tosylated β-cyclodextrin (compound D).

Figure 4:
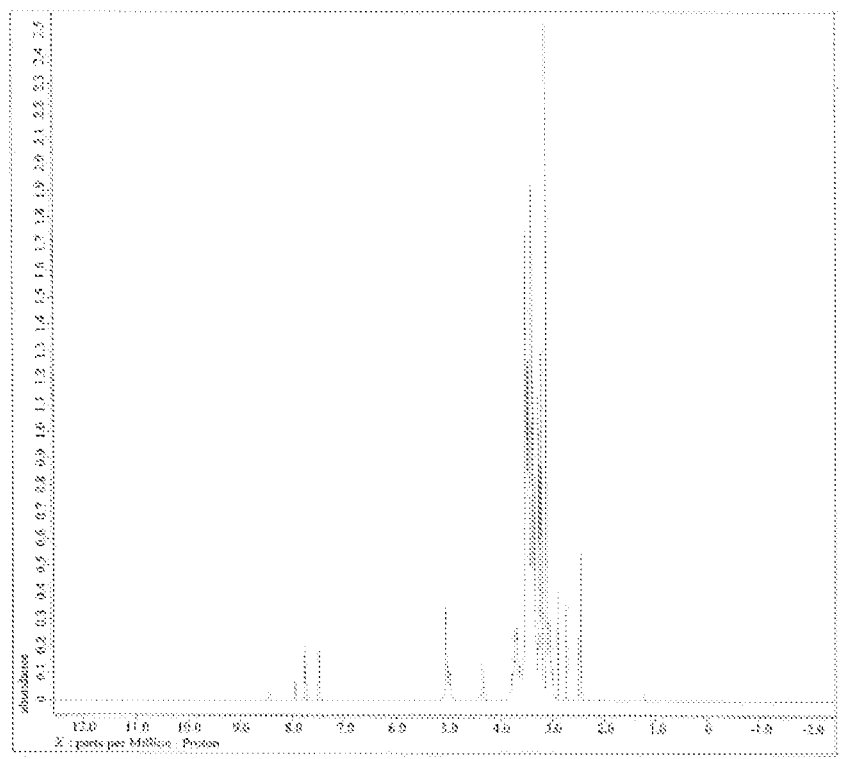
FIG. 4 is a $^1$H-NMR chart of a compound D obtained in Synthesis Example 4.

A $^1$H-NMR chart at this time was shown in FIG. 4 (characteristic peak $^1$H NMR (DMSO-$d_6$): 2.98-3.11 (m, 19H), 3.19-3.28 (m, 28H), 3.30-3.59 (m, 42H), 3.61-3.77 (m, 14H), 4.34 (s, 2H), 4.94-5.15 (m, 7H), 7.48 (d, J=7.6 Hz, 2H), 7.75 (d, J=7.6 Hz, 2H)).

It was confirmed that a purity was 97.7% based on an integral value of $^1$H NMR.

In addition, since a $^1$H NMR peak (5.64-5.85 (m, 14H)) of a secondary hydroxy group had disappeared, a degree of modification of the hydroxy group was 90% or more.

Synthesis Example 5

To a flask equipped with a cooling tube and a stirring rod, 3.16 g of the compound D obtained in Synthesis Example 4 and 11.99 g of 1,3-propanediamine were charged, and the mixture was heated and stirred at 70° C. for 2 hours. The reactant was cooled, added with 320 ml of toluene, and washed with water. An organic layer was dried with sodium sulfate, and toluene was distilled off, and drying was performed to obtain 2.29 g of methyl-etherified 6-deoxy-6-(3-aminopropylamino)-β-cyclodextrin (compound E).

Figure 5:
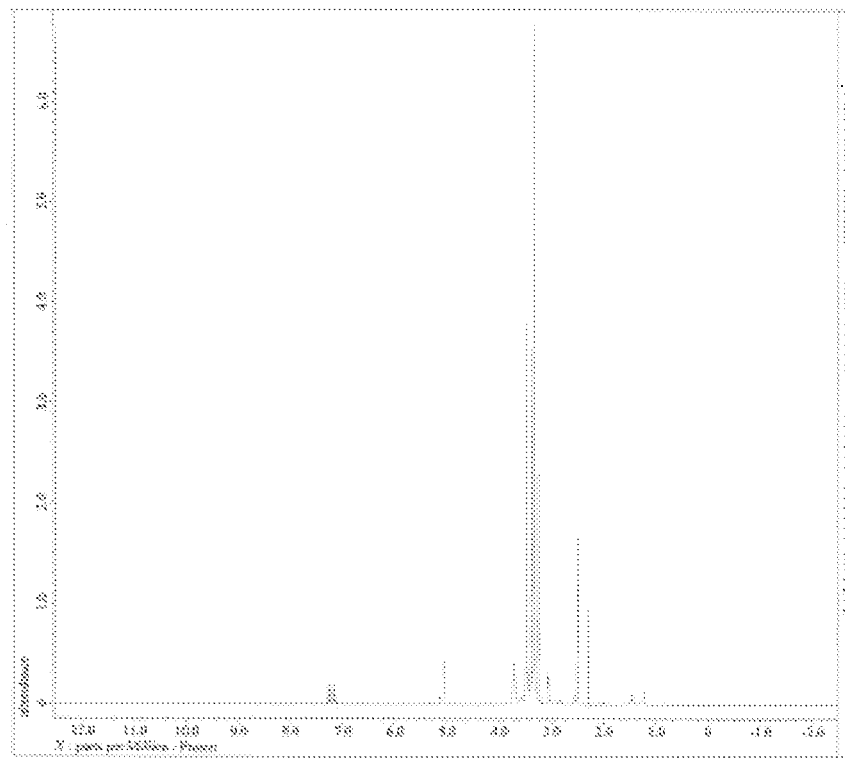
FIG. 5 is a $^1$H-NMR chart of a compound E obtained in Synthesis Example 5.

A $^1$H-NMR chart at this time was shown in FIG. 5 (characteristic peak $^1$H NMR (DMSO-$d_6$): 1.49-1.42 (m, 2H), 2.60-2.52 (m, 2H), 2.87-2.83 (m, 2H), 3.06-3.73 (m, 102H), 5.04-5.32 m, 7H).

It was confirmed that a purity was >99% based on an integral value of $^1$H NMR.

Synthesis Example 6

To a flask equipped with a stirring rod, 1.74 g of the compound E obtained in Synthesis Example 5, 0.13 g of triethylamine, and 4 g of toluene were charged, and the mixture was stirred. 0.18 g of methacrylic anhydride was added dropwise thereto, and the mixture was further stirred for 1 hour. The obtained solution was washed with water three times, and dried with sodium sulfate, then toluene was distilled off, and drying was performed to obtain 1.51 g of methyl-etherified methacrylamide group-containing β-cyclodextrin (compound F).

Figure 6:
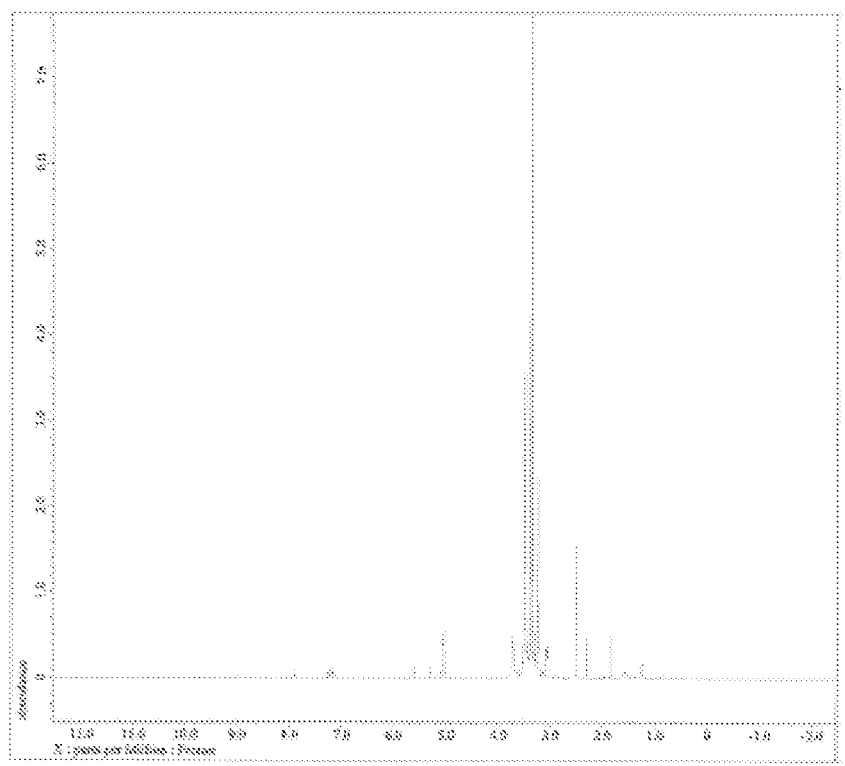
FIG. 6 is a $^1$H-NMR chart of a compound F obtained in Synthesis Example 6.

A $^1$H-NMR chart at this time was shown in FIG. 6 (characteristic peak $^1$H NMR (DMSO-$d_6$): 1.58-1.55 (m, 2H), 1.83 (s, 3H), 2.90-2.67 (m, 4H), 3.71-3.02 (m, 102H), 5.31-5.04 (m, 7H), 5.29 (m, 1H), 5.60 (m, 1H), 7.90 (t, J=5.2 Hz, 1H).

It was confirmed that a purity was >99% based on an integral value of $^1$H NMR.

Synthesis Example 7

To a flask equipped with a stirring rod, 0.54 g of the compound E obtained in Synthesis Example 5, 57 mg of KARENZ MOI (manufactured by Kyoeisha Chemical Co., Ltd.), and 2 g of toluene were charged, and the mixture was stirred for 1 hour. The obtained solution was washed with water three times and dried with sodium sulfate, then toluene was distilled off, and drying was performed to obtain 0.60 g of methyl-etherified methacryl group-containing β-cyclodextrin (compound G).

Figure 7:
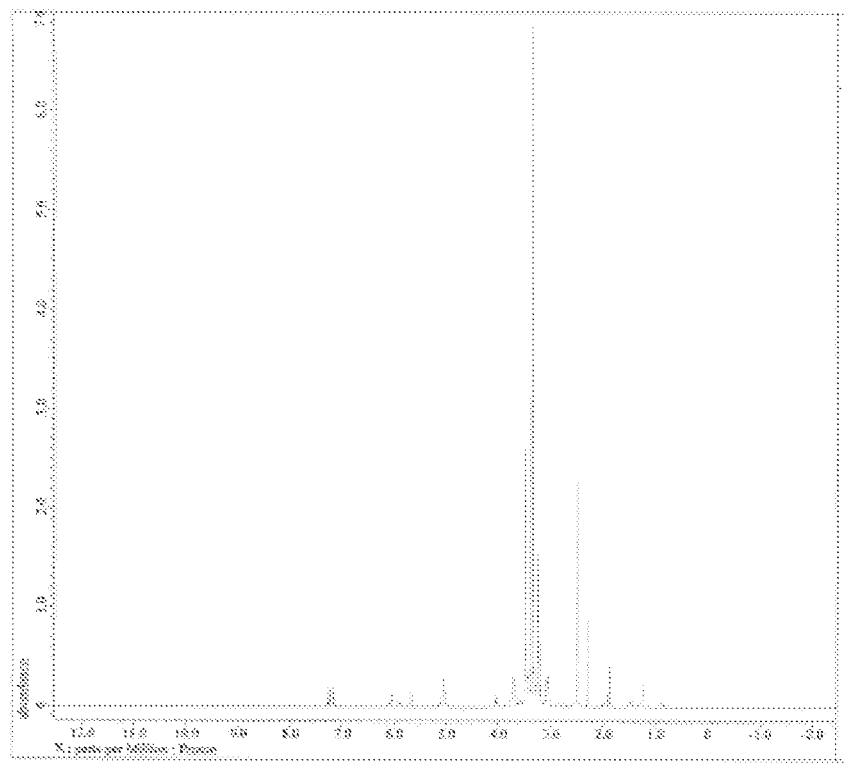
FIG. 7 is a $^1$H-NMR chart of a compound G obtained in Synthesis Example 7.

A $^1$H-NMR chart at this time was shown in FIG. 7 (characteristic peak $^1$H NMR (DMSO-$d_6$): δ1.51-1.46 (m, 2H), 1.90 (s, 3H), 2.03-1.86 (m, 4H), 4.05-3.05 (m, 106H), 5.32-5.00 (m, 7H), 5.68 (m, 1H), 5.89 (t, J=5.2 Hz, 1H), 5.93 (t, J=5.6 Hz, 1H), 6.05 (m, 1H).

It was confirmed that a purity was >99% based on an integral value of $^1$H NMR.

INDUSTRIAL APPLICABILITY

The cyclodextrin derivative according to the present invention may be a raw material for obtaining a polymer contained in a polymeric material. In addition, the polymer obtained using the cyclodextrin derivative according to the present invention may have, for example, a structure in which molecules are crosslinked by reversible host-guest interaction.

The invention claimed is:

1. A polymerizable unsaturated group-containing cyclodextrin derivative represented by the following formula (1):

where $R^1$ represents any one of:
(A) the following formula (2)

where $R^3$ is an alkylene group having 3 to 20 carbon atoms, may be linear or branched, and may have a substituent; and $R^4$ represents a (meth)acryloyl group or a vinyl group-containing alkyl group having 3 to 50 carbon atoms, (B) the following general formula (3)

where $R^5$ is an alkylene group having 3 to 20 carbon atoms, may be linear or branched, and may have a substituent; and $R^6$ represents a (meth)acryloyloxyalkyl group having 4 to 50 carbon atoms or a vinyl group-containing alkyl group having 3 to 50 carbon atoms, or (C) the following general formula (4)

where $R^5$ and $R^6$ are the same as those defined above, $R^2$ represents a hydrogen atom, an acyl group having 2 to 50 carbon atoms, or an alkyl group having 1 to 30 carbon atoms, and $R^c$ represents a group represented by the following formula (5):

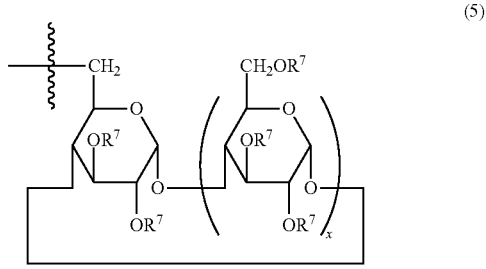

where $R^7$ may be the same as, or different from, each other, and each represents a hydrogen atom, an acyl group having 2 to 50 carbon atoms, an alkyl group having 1 to 30 carbon atoms, or —CONHR$^8$, where $R^8$ is an alkyl group having 1 to 20 carbon atoms; wherein 20% or more of $R^7$ is any one of an acyl group having 2 to 50 carbon atoms, an alkyl group having 1 to 30 carbon atoms, or —CONHR$^8$; and x is an integer of 5 to 7.

2. The polymerizable unsaturated group-containing cyclodextrin derivative according to claim 1, wherein the acyl group is an acetyl group.

3. The polymerizable unsaturated group-containing cyclodextrin derivative according to claim 1, wherein the alkyl group is a methyl group.

* * * * *